United States Patent [19]
Kurita et al.

[11] Patent Number: 5,715,066
[45] Date of Patent: Feb. 3, 1998

[54] IMAGE PROCESSING SYSTEM FOR CONNECTING INTERFACES TO A PLURALITY OF EXTERNAL APPARATUSES

[75] Inventors: Mitsuru Kurita, Tokyo; Yasumichi Suzuki, Yokohama; Toshiyuki Kitamura, Yokohama; Tsutomu Utagawa, Yokohama, all of Japan

[73] Assignee: Canon Kabushiki Kaisha, Japan

[21] Appl. No.: 288,304

[22] Filed: Aug. 10, 1994

[30] Foreign Application Priority Data

Aug. 24, 1993  [JP]  Japan .................................. 5-209395

[51] Int. Cl.$^6$ ................................................. H04N 1/32
[52] U.S. Cl. .......................... 358/296; 358/407; 358/434
[58] Field of Search ................................ 358/296, 400, 358/401, 407, 434, 442, 468; 395/114; 355/202; 399/75, 76, 81, 90, 1, 38

[56] References Cited

U.S. PATENT DOCUMENTS

| | | | |
|---|---|---|---|
| 4,573,083 | 2/1986 | Shimizu | 358/407 |
| 4,785,355 | 11/1988 | Matsumoto | 358/434 |
| 4,837,812 | 6/1989 | Takahashi et al. | 358/434 |
| 5,510,876 | 4/1996 | Hayashi et al. | 355/202 |

*Primary Examiner*—Eric Frahm
*Attorney, Agent, or Firm*—Fitzpatrick, Cella, Harper & Scinto

[57] ABSTRACT

An image processing system includes a plurality of image processing devices which are sequentially connected to transmit image data to each other. Each device includes a storing unit for storing image data, and any one of the devices which is not currently selected for transmission can concurrently be used as a copy machine.

9 Claims, 13 Drawing Sheets

FIG.5

| CODE | COMMAND | CONTENTS |
|---|---|---|
| 10 | INTERFACE CLEAR | ISSUED BY MASTER STATION AFTER IT HAS BEEN INITIALIZED AT POWER TURN-ON |
| 01 | PRINT START | ISSUED BY SOURCE OF IMAGE TRANSFER. CONTAINS ADDRESS OF START-REQUEST SOURCE, ADDRESS OF START-REQUEST DESTINATION, PAPER SELECTION, NUMBER OF SHEETS, ETC. |
| 03 | STATUS REQUEST | ISSUED BY MASTER AT FIXED INTERVALS. CONTAINS ADDRESS OF REQUEST SOURCE |
| 05 | STAUS TRANSFER | ISSUED BY SLAVE WITHIN FIXED PERIOD OF TIME IN RESPONSE TO STATUS REQUEST FROM MASTER. CONTAINS OWN ADDRESS FOLLOWED BY PRINTER STATUS, ABSENCE OR PRESENCE OF ERROR, ETC. |
| 06 | END OF IMAGE TRANSFER | ISSUED BY SOURCE OF IMAGE TRANSFER AFTER END OF IMAGE TRANSFER |

# IMAGE PROCESSING SYSTEM FOR CONNECTING INTERFACES TO A PLURALITY OF EXTERNAL APPARATUSES

BACKGROUND OF THE INVENTION

1. Field of the Invention

This invention relates to an image processing system in which a plurality of image processing units are interconnected and capable of processing images simultaneously.

2. Background of the Invention

A reader and a printer together constituting a digital copier are capable of being utilized independently as an image reading device and an image output device, respectively. Accordingly, systems have been proposed in which the reader/printer is connected to a conventional computer system using an external interface (I/F) so as to be utilized as an image input/output unit, or in which a plurality of sets of reader/printers are distributed and connected and a central control unit for controlling them is provided to allow a high copy volume (CV) using the plurality of printers simultaneously. Such systems having plural reader/printers seek to provide a higher printing speed. However, the number of digital copiers and the length of interface cables are restricted in accordance with the data transmitting speed.

Moreover, in the system development of such digital copiers, each digital copier uses a two-way interface so that image data which is read at any reader unit is stored in all the memory units of the digital copiers. As a result, since the digital copier acting as a data resource has to transmit image data through its output interface to the input interfaces of each of the other digital copiers, limitations are encountered in terms of flexible system expansion according to need.

Another factor to be considered is that each digital copier should have the ability to output not only a duplicate original, but also images of a wide variety of types, e.g., computer graphics (CG). Such functions are essential in modern digital copiers.

SUMMARY OF THE INVENTION

Accordingly, an object of the present invention is to provide an image processing apparatus for obtaining a highly efficient image output by using a plurality of apparatuses.

Another object of the present invention is to provide an image processing apparatus which includes a first interface means for first external transferring means for transferring image data device, second interface means for second external image processing device, relay means for relaying said image data to either of said first and second image processing external devices using said first interface means or said second interface means.

Another object of the present invention is to provide an image processing apparatus which includes first interface means for transferring image data to first external image processing device whose address is different from said current apparatus, second interface means for receiving image data from second external image processing device whose address is different from both of said apparatus and said first external device selecting means for selecting said interface to be used wherein, said first external device and said apparatus and said second external device are sequentially connected and said image data are transferred sequentially by using said selecting means.

BRIEF DESCRIPTION OF THE DRAWINGS

FIG. 5 is a diagram showing the main commands used in serial communication in a tandem system according to this embodiment;

DESCRIPTION OF THE PREFERRED EMBODIMENTS

Embodiments according to the present invention will now be described with reference to the accompanying drawings.

GENERAL EXPLANATION OF THE SYSTEM

Figure 1:
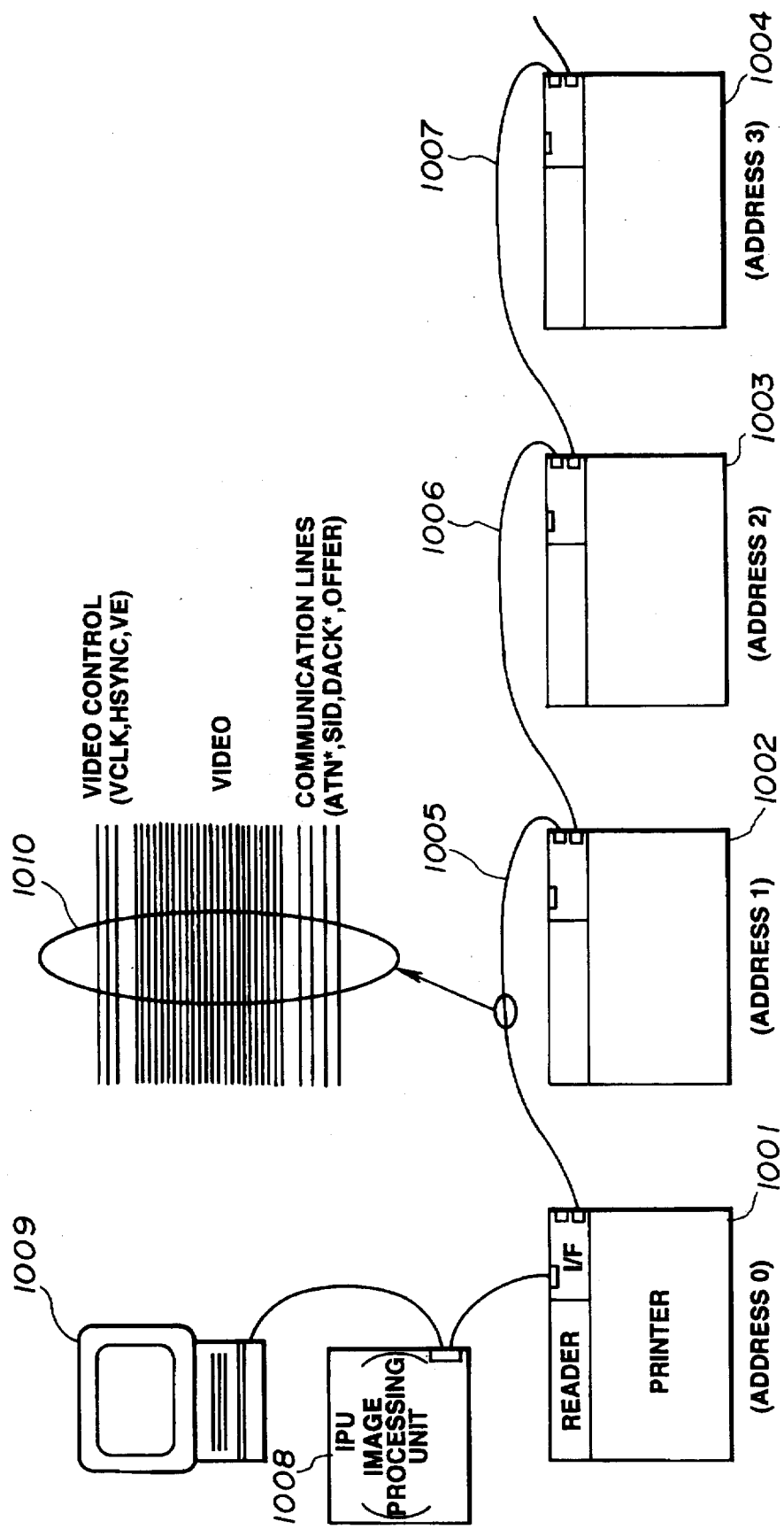
FIG. 1 is conceptual view showing the connected configuration of a tandem system according to the present invention.

FIG. 1 illustrates a tandem system configuration in accordance with an embodiment of the present invention, in which each image processing device is constituted by a digital copier.

As shown in FIG. 1, numerals 1001~1004 denote digital copiers, each of which shall be referred to as a "station" hereinafter. Each station has its own, different system address. The system addresses of the stations 1001~1004 are respectively "0", "1", "2", "3." In this embodiment it is required that there be a "0" address. Cables 1005~1007 are for connecting these stations to the tandem system and, as shown at numeral 1010, each cable includes a total of 24 video signal lines, specifically eight for each of the colors R, G, B, three video control lines and four serial communication lines. An interface device 1008 (the device shall be referred to as an "IPU" hereinafter) is for connecting these digital copiers to a conventional computer, referred to as host computer 1009.

In this embodiment, there is an order of connection for supplying the video signal among the stations in the tandem system by the cables 1005~1007 in accordance with the address value. Thus the station with address 0 is placed at one extremity of the system, and the other system addresses are connected in ascending order starting from this position.

Figure 2:
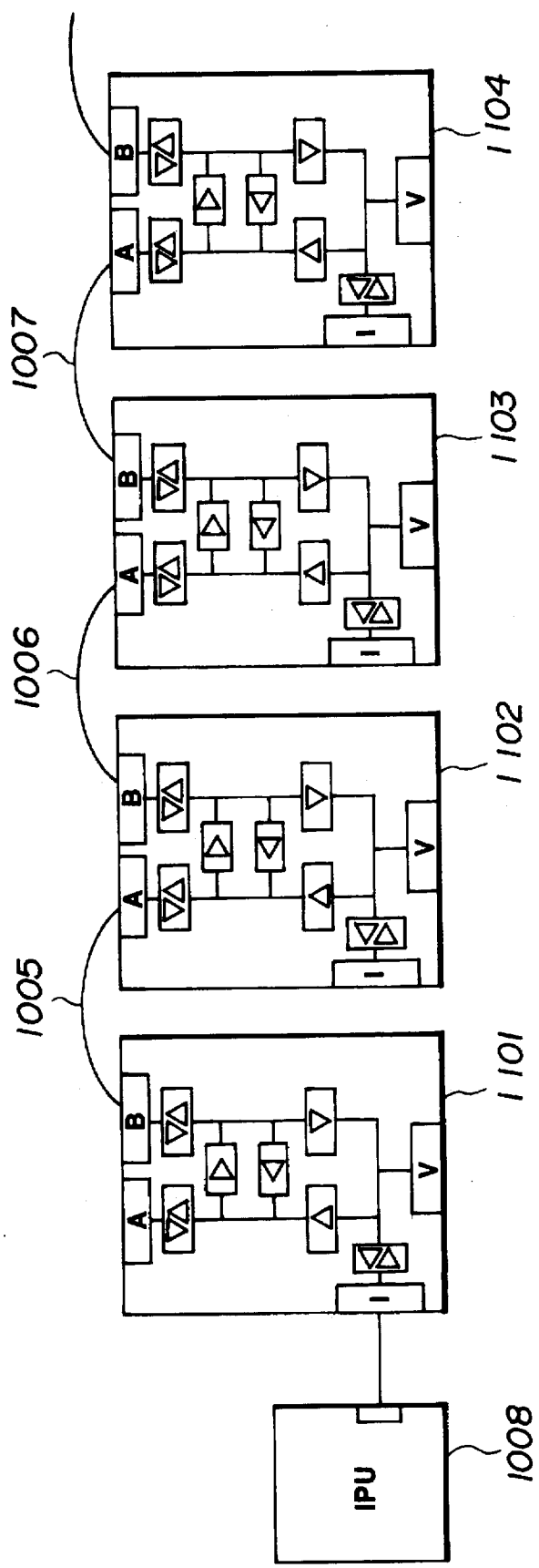
FIG. 2 is a conceptual view showing the connected configuration of video-signal related portions in the tandem system of FIG. 1.

FIG. 2 illustrates the manner in which video signals are supplied in the system constructed as set forth above.

In FIG. 2, numerals 1101~1104 denote interfaces of stations 1001~1004. Numeral 1108 denotes an interface of the IPU 1008.

In FIG. 2, A and B of the interfaces 1101~1104 respectively denote connecting points between the respective station and other stations. Connecting point A is used for connecting the respective station and another station which has a smaller address value than that of the respective station, while connecting point B is used for connecting the respective station and another station which has a bigger address value than that of the respective station.

Figure 3:
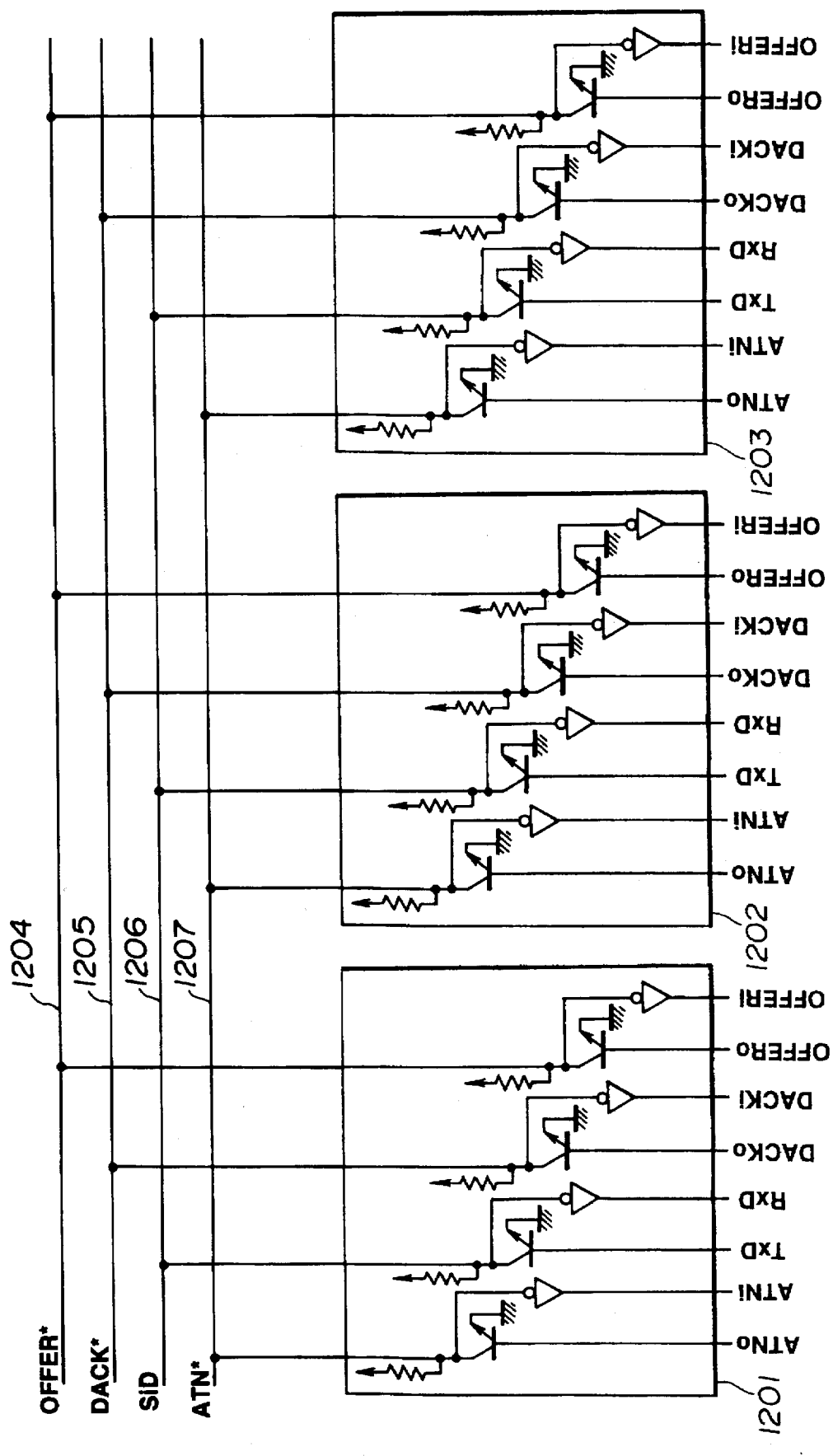
FIG. 3 is a conceptual view showing the connected configuration of a serial communication-line portion in the tandem system of FIG. 1.

FIG. 3 illustrates the detailed connections of the cables 1005~1007 (serial communication lines) in each of the interfaces illustrated in FIG. 2 of the system.

In FIG. 3, numerals 1201~1203 denote those portions of the interfaces 1101~1103 for serial communication contained in the respective stations 1001~1003 depicted in FIG. 2. There are four signal lines for serial communication, namely lines ATN* (1207), SiD* (1206), DACK* (1205) and OFFER, (1204).

ATN* is a synchronizing signal indicating that data transfer from a master station (defined as the station at system address 0) in the tandem system is in progress. That a data transfer is being carried out is indicated when ATN*=low. At stations other than the master station (these stations shall be referred as "slave stations" hereinafter), the line of ATN* is always an input.

The signal OFFER*=low indicates that a slave station is transmitting data to the master station. This is always an input at the master station. A plurality of slave stations are connected in the form of a wired OR. DACK* is a signal indicting that data reception has been completed on the data-receiving side. The stations are interconnected in the form of a wired OR. Accordingly, in a case where a plurality of stations are receiving sides, the station that is slowest in completing data reception renders DACK* inactive, at which time DACK* on the line becomes inactive. As a result, the exchange of data between stations is synchronized.

SiD* is bidirectional serial data. Data is exchanged in synchronism with ATN* (master→slave) and OFFER* (slave→master). The method of data transfer is half-duplex start-stop synchronization. The transfer speed and data format are set beforehand at system start-up.

Figure 4:
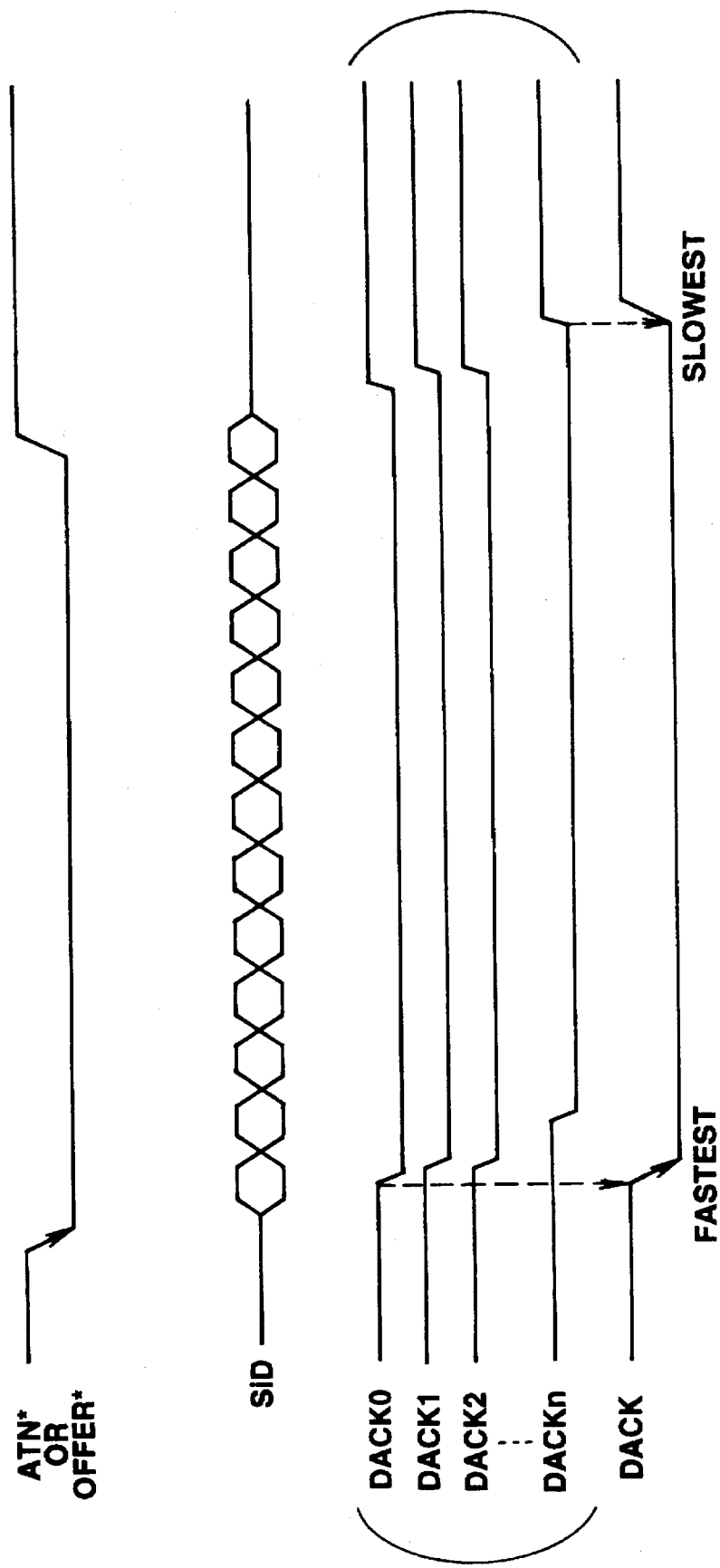
FIG. 4 is a timing chart illustrating the timing of data transmission in serial communication in a tandem system according to this embodiment.

Each of the interface portions 1201~1203 has eight signal lines connected as output lines to controllers for the respective station. Lines TxD and RxD are connected respectively to I/O ports to transmit/receive serial communication; ATNo, DACKo, OFFERo are connected to I/O ports for input; and ATNi, DACKi, OFFERi are connected to I/O ports for output. FIG. 4 is a timing chart of each of the signals at the time of data transmission in the embodiment described above.

As shown in FIG. 4, when either signal ATN* or the signal OFFER* is "L" (when data is transmitted from the master station to the slave station or when data is transmitted from the slave station to the master station), the signal SiD* is transmitted between the master station and the slave station. If the signal ATN* is "L" and data is being transmitted from the master station to a plurality of slave stations, the signal DACK* of the slave station which begins to receive data first becomes "L" (DACKO in FIG. 4), and the signal line DACK* 1205 in FIG. 4 becomes "L". When the signal DACK* of the slave station which is slowest in completing the data reception becomes "L" (DACKn in FIG. 4), the signal line DACK* becomes "H".

FIG. 5 is a diagram showing the main commands transmitted by the communication lines 1204~1207 in serial communication in the tandem system.

In FIG. 5, an interface-clear command having a code 10 is a command that resets parameters associated with the tandem system. The master station defined to have the system address 0 issues this command after it itself has been initialized. Each slave station receives this command, fixes ATN* at the input and initializes its internal parameters.

A station-request command having a code 03 is a polling command for acquisition of information such as the status of the slave stations connected to the tandem system. After the master station has issued the interface-clear command, the master station issues the status-request command to each slave station at fixed times. This command includes a request-destination address as a parameter for designating the slave station.

A status-transfer command having a code 05 is a command which the slave station designated by the above-mentioned status-request command issues to each station in the tandem system to inform each station of its own (the designated slave station) status. When a slave station has been designated by the master station, the slave station must issue this command within a fixed period of time. This command includes various flags representing the system address of the slave station itself, the absence or presence of an error, whether the slave station is waiting or whether copying is in progress, and parameters indicating the type of recording paper, whether paper is available or has run out, etc. If the slave station designated by a status-request command from the master station fails to issue a status-transfer command upon elapse of the fixed time period, the master station renders a decision to the effect that the designated slave station is not connected to the tandem system.

A print-start command having a code 01 is a command which designates whether a station transferring an image uses another station, the identity of the other station, and how a number of sheets are to be distributed to each station used, whereby each station used is made to prepare for reception of an image. This command includes parameters such as the address of the source of the image transfer, a request-destination address, paper size and number of sheets.

An image transfer-end command having a code 06 is issued by the station which is the source of image transfer and is for informing other stations of the fact that image transmission has ended.

Figure 6:
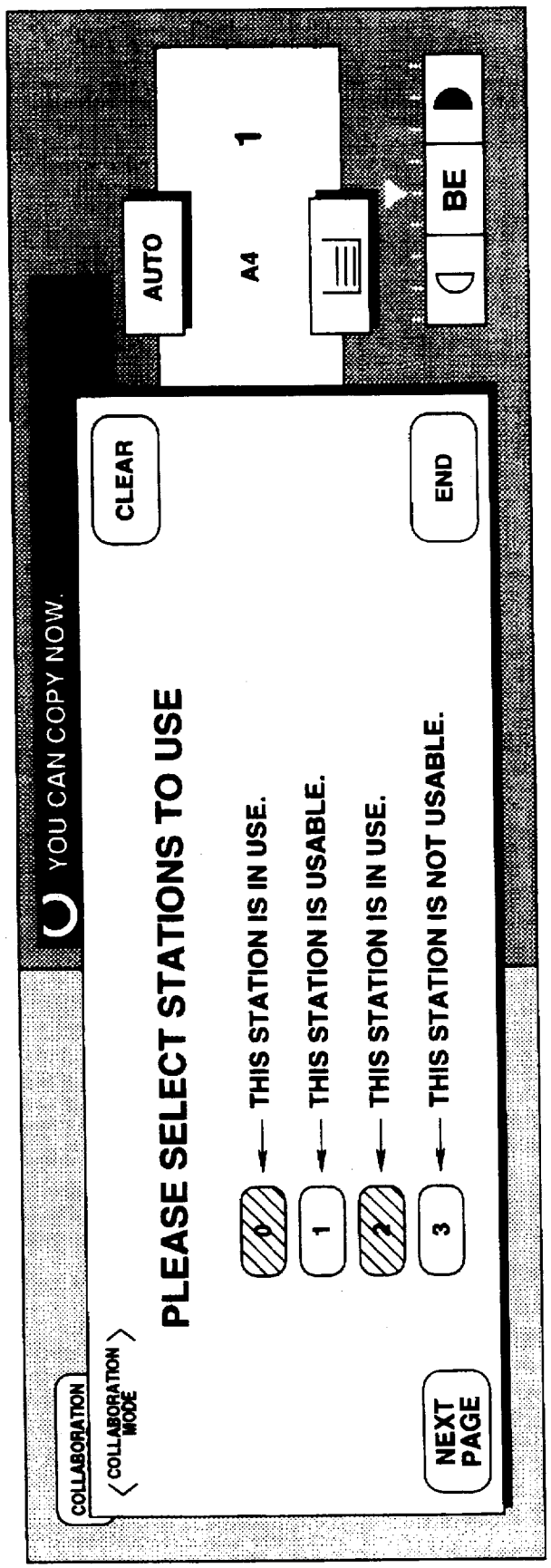
FIG. 6 is a diagram showing an operating panel of a color copier in the tandem system.

FIG. 6 shows a example of a display panel which is located each station 1001~1004 in FIG. 1. The display panel displays information as to which station can be used or not, as discussed below.

Figure 7:
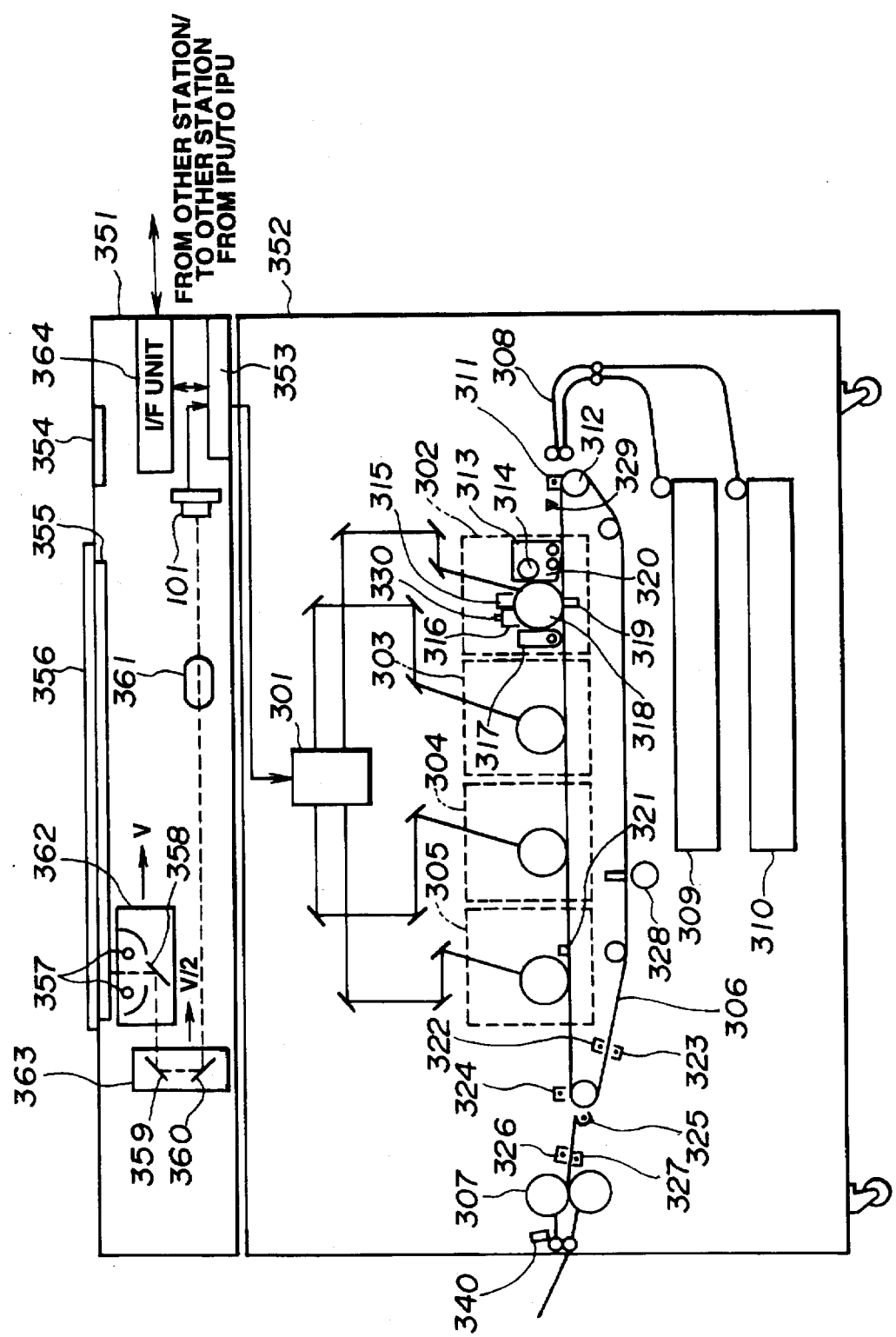
FIG. 7 is a diagram showing the construction of an image forming device at each station in this embodiment.

FIG. 7 is a cross-sectional view of one of the identical stations 1001~1004. The station shown in FIG. 7 is constituted by a reader 351 for reading a color original and executing digital editing processing, and a printer 352, having different image carriers, for reproducing a color image in conformity with a digital signal of each color sent from the reader 351.

In FIG. 7, numeral 101 is a CCD and 353 is a digital image processing unit. 354 is the operating panel as illustrated in FIG. 6. 355 is a platen. 356 is a press panel. 357 is a halogen lamp. 358~360 are mirrors. 361 is a lens which gathers catoptric light of the halogen lamp 357 to the CCD101. 362 is a carriage which holds the halogen lamp 357 and the mirror. 363 is a carrier which holds the mirrors 359, 360. 364 is an interface unit which connects this station to the others or the IPU 1008. The carriage 362 moves at velocity V in the perpendicular direction to a main scan, while the carriage 363 moves at velocity V/2 in the same direction. Thus they can execute sub-scanning of an entire original image.

CONSTRUCTION OF THE STATIONS

Figure 8:
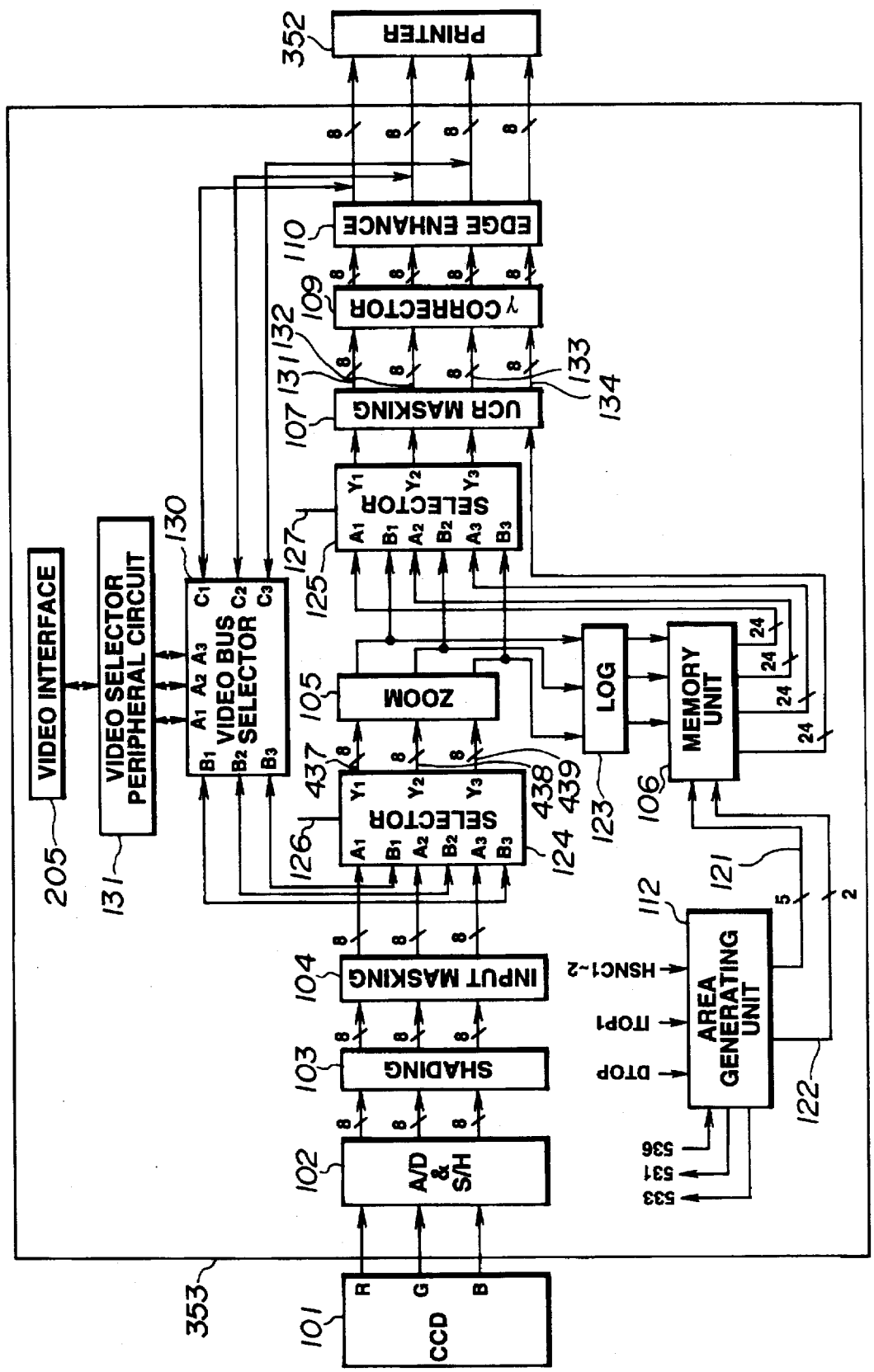
FIG. 8 is a block diagram showing a digital image processing section of a reader in the image forming device depicted in FIG. 7.

FIG. 8 is a block diagram illustrating the digital processing section of the reader 351. A color image on the platen is exposed by a halogen lamp. As a result, the reflected image is sensed by a CCD 101, and sampled and held and then converted to a digital signal by an A/D and sample hold (S/H) circuit 102, and the digital signals are inputted to the image processing unit 353, whereby digital signals in each of the three colors R, G, B are produced.

The data separated by color is subjected to shading and is black-corrected by a shading circuit 103, after which the resulting data is corrected to an NTSC signal by an input masking circuit 104. The output of the circuit 104 is sent to a selector 124. In accordance with a selection input 126 controlled by a CPU (not shown), the selector 124 selects any of image signals ($A_1$~$A_3$) from the circuit 104 or selects any of image signals ($B_1$~$B_3$) from an external device. The selected signals are inputted to the zoom circuit 105. The zoom circuit 105 executes an enlargement or reduction process in the main scan direction. The result of the zoom circuit 105 is inputted to a LOG circuit 123 and the selector 125, which is controlled by signal 127 of the CPU. The output of the LOG circuit 123 is inputted in the memory unit 106 and video color data is stored as YMC data. This data is read out in conformity with the timing of each of four drums of the printer 352.

The masking-UCR circuit 107 executes four-color masking-UCR processing on the output signal of the selector 125 in the case of selecting $Al_1A_3$. The color data in the form YMCBk is outputted from the signal lines 131~134.

The masking-UCR circuit 107 subjects the output signal from the selector 125 (in the case of selecting $B_1$~$B_3$) to four-color masking-UCR processing. The output of the masking-UCR circuit 107 is γ-corrected by a γ-corrector circuit 109, whose output is subjected to edge-emphasis processing by an edge emphasizing circuit 110. The color data including the γ-correction and the edge-emphasis is transmitted to the printer unit 352.

In FIG. 8, DTOP is an output signal from a sensor, provided a fixed distance ahead of the end of the original, for detecting the original end position. HSNC1 is a horizontal synchronizing signal generated internally. HSNC2 is a horizontal synchronizing signal generated externally. ITOP1 is an output signal from a sensor for detecting a paper end position. 122 indicates a main-scan writing enabling signal and a reading enabling signal which are produced in accordance with a writing sub-scan enabling signal 536. 121 indicates a sub-scan enabling signal (one bit) and four enabling signals (four bits) for each color data (YMCK). The signals 121~122, the ITOP1 signal and a sub-scan video enabling signal 531 are produced at an area producing unit 116 in accordance with an external signal such as a sub-scan enabling signal 536 or the DTOP signal.

138 is a video bus selector which outputs video signals to the outside and receives video signals from the outside.

Figure 9:
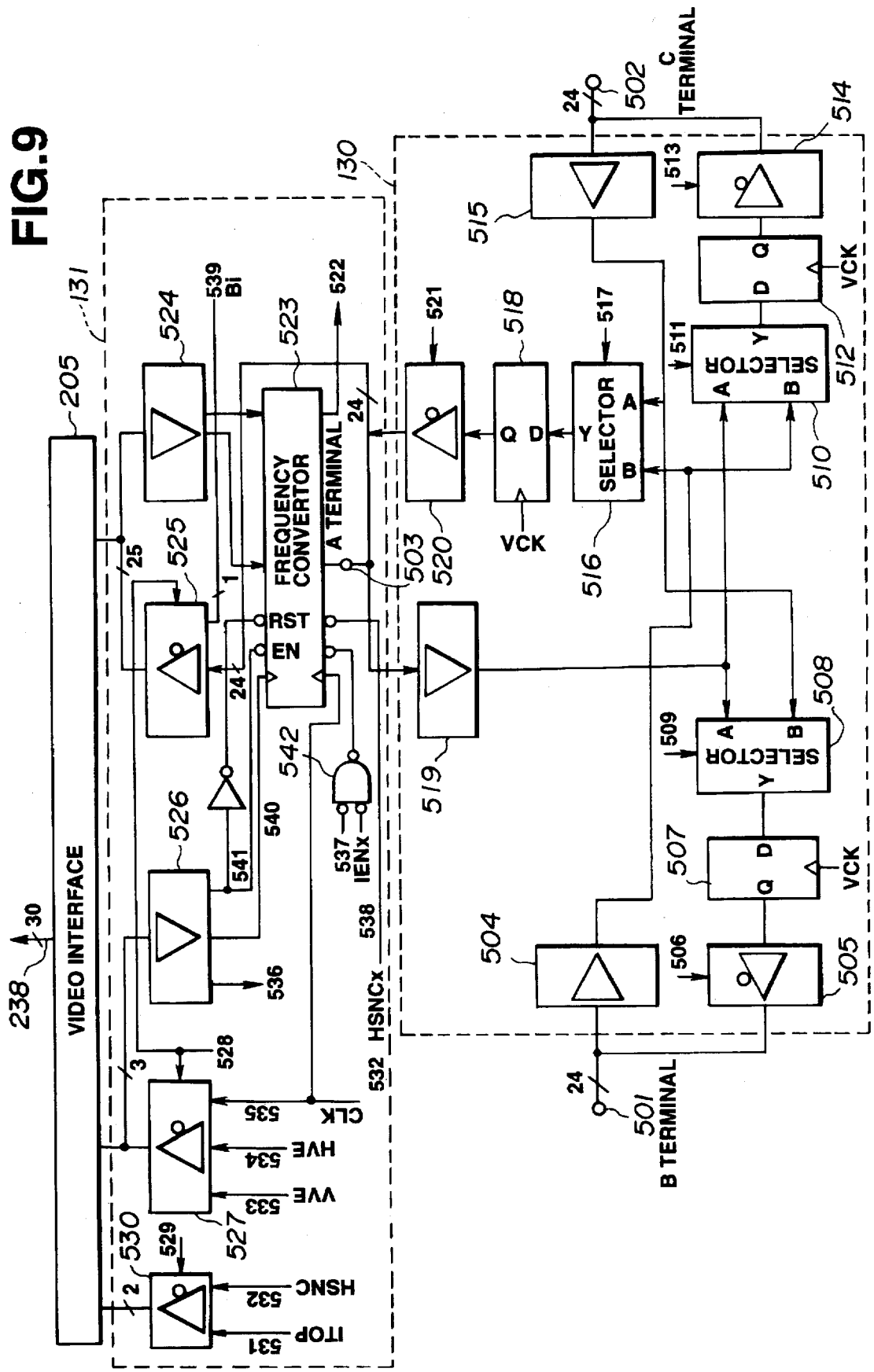
FIG. 9 is a block diagram showing a video-bus selector in FIG. 8 and equipment peripheral thereto.

FIG. 9 is a detailed block diagram showing the video bus selector 130 and equipment peripheral thereto. The video bus selector 130 and peripheral equipment include bidirectional buffers 504 and 505, 514 and 515, 519 and 520, 524 and 525, 526 and 527, signal lines 506, 513, 521, 528, 529 by which a CPU (not shown) controls the bidirectional buffers, an output buffer 530, and a frequency converter (realized by a FIFO buffer) 523.

501~503 are respectively a B terminal for inputs $B_1B$~$B_3$, a C terminal for inputs $C_1$~$C_3$ and an A terminal for inputs $A_1$~$A_3$ of the video selector 130. 508 is a selector for selecting the A-terminal or C-terminal. 507 is a flip-flop whose input is the output of the selector 508 and which outputs the inputted signal from the selector 508 through an output buffer 505 to the terminal B 501 synchronized with a signal VCK.

510 is a selector for selecting the A-terminal input or the B-terminal input. 512 is a flip-flop (DF/F) whose input is the output of the selector 511 and which outputs through an output buffer 514 to the terminal A 503 synchronized with the signal VCK. 516 is a selector for selecting the B-terminal input or the C-terminal input. 518 is a flip-flop (DF/F) whose input is the output of the selector 516 and which outputs the inputted signal from the selector 516 through an output buffer 531 to the terminal A 503 synchronized with the signal VCK.

The color R or C is inputted in or outputted from the terminal $A_1$, $B_1$, $C_1$. The color G or M is inputted in or outputted from the terminal $A_2$, $B_2$, $C_2$. The color B or Y is inputted in or outputted from the terminal $A_3$, $B_3$, $C_3$.

Numeral 531 denotes a sub-scan synchronizing signal (ITOP2) of the IPU 1008. 532 denotes a main-scan synchronizing signal (HSNCX) of the IPU 1008. 533 is a sub-scan enabling signal (VVE1) for the other stations. 534 is a main-scan enabling signal (HVE*) for the other stations. 535 is a video clock (VCK) for the station itself and for the other stations. 536 is a sub-scan writing enabling signal from the other stations (including the master station). 508, 511, 517 and 537 are signals which are set by the CPU (not shown). 538 is an enabling signal IENX of the frequency converter 523. 539 is digital data to be transmitted which is stored in the bit map memory. 540 is a writing clock of the frequency converter 523 and which is a video clock from the other stations. 541 is a writing reset signal which is inverted by the writing enabling signal and the invertor. 542 is a OR gate. HSNCX 532 is a reading reset signal of the frequency converter that is inverted. 522 is a digital signal from a bit map memory of another station.

The flow of video signals in a number of modes as mentioned below will be described with reference to FIGS. 8 and 9. In this embodiment, stations 1001~1004 are connected each other. Each station can execute a copy process in a "copy mode", transmit video signals from an original to other stations in an "external interface output mode", and receive image signals produced in other stations and print them in an "external interface input mode".

Ordinary Copying Mode (1) Flow of image signal

Processing is executed sequentially in the order of CCD 101→A/D & S/H circuit 102→shading circuit 103→input masking circuit 104→selector 124 (input A is selected) →zoom circuit 105→LOG circuit 123→memory 106→selector 125 (input A is selected)→masking-UCR circuit 107→γ-corrector circuit 109→edge emphasizing circuit 110→printer 352. Thus the image information resulting from reading of the image by CCD 101 is printed out by the printer 352, whereby a copy is obtained.

(2) Setting of I/O of video selector 130 and peripheral circuitry shown in FIG. 8

506→"1" (high level)
509→X
511→X
513→"1" (high level)
517→X
521→X

528→"1" (high level)
529→"1" (high level)
537→"1" (high level)
(X represents "don't care").

Output to External Interface (1) Flow of image signal

Processing is executed sequentially in the order of CCD 101→A/D & S/H circuit 102→shading circuit 103→input masking circuit 104→selector 124 (A input is selected) zoom circuit 105→selector 125 (B input, i.e., the output (RGB signal) from the zoom circuit, is selected)→masking-UCR circuit 107→γ-corrector circuit 109→edge emphasizing circuit 110→video selector 130→video interface 205. Thus the image information resulting from reading of the image by CCD 101 is outputted as an RGB signal by the external interface (video interface 205).

(2) Setting of I/O of video selector 130 and peripheral circuitry shown in FIG. 8

506→"1" (high level)
509→X
511→X
513→"1" (high level)
517→"0" (low level)
521→"0" (low level)
528→"0" (low level)
529→"0" (low level)
537→"0" (high level)

Input from External Interface (1) Flow of image information (video)

Processing is executed sequentially in the order of video interface 205→video selector 131→video-bus selector 130→selector 124 (B input is selected)→zoom circuit 105→LOG circuit 123→memory 106→selector 125 (A input is selected)→masking-UCR circuit 107→γ-corrector circuit 109→edge emphasizing circuit 110→printer 352. Thus image information sent in from the outside via the video interface 205 is printed out by the printer 352, whereby a copy is obtained.

Furthermore, a sub-scan write-enable of the memory 106 employs a signal 536 shown in FIG. 8 applied to the area generator 112 via the video interface 205.

2) Setting of I/O of video selector 130 and Peripheral circuitry shown in FIG. 8

506→"0" (low level)
509→"0" (low level)
511→X
513→"1" (high level)
517→"0" (low level)
521→"1" (high level)
528→"1" (high level)
529→"0" (low level)
537→"0" (low level)

CONSTRUCTION OF PRINTER 352

The detailed construction of the printer 352 according to this embodiment will now be described with reference to FIGS. 7 and 10. In FIG. 7, numeral 301 denotes a polygon scanner for causing laser beams to scan photosensitive drums, and 302 an image forming unit for magenta (M). Also provided are similarly constructed image forming units 303, 304, 305 for the colors cyan (C), yellow (Y) and black (K), respectively.

Figure 10:
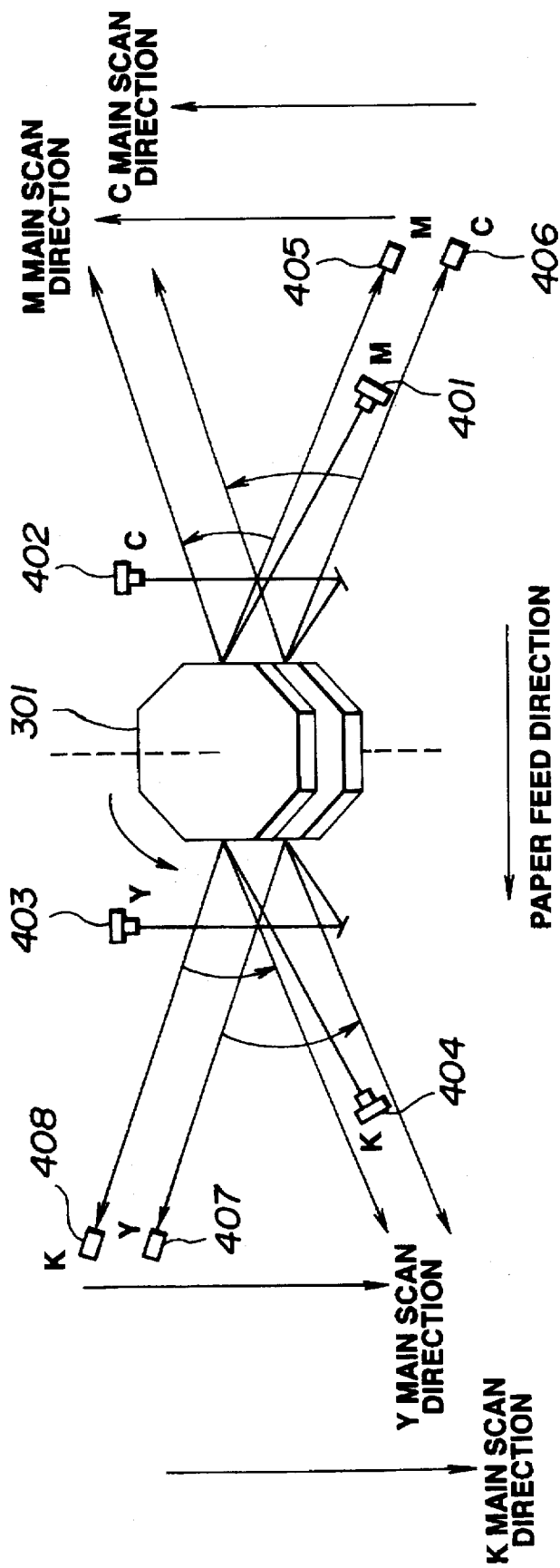
FIG. 10 is a conceptual view showing the construction of a polygon scanner in a reader.

As shown in FIG. 10, the polygon scanner 301 is so adapted that photosensitive drums for the colors M, C, Y, K are scanned by laser beams from laser elements 401–404 driven independently for the colors M, C, Y, K by a laser controller (not shown). Numerals 405–408 denote BD sensing means for sensing the scanned laser beams and generating the main-scan synchronizing signals.

In a case where two polygon scanners are arranged coaxially and rotated by one motor, as in this embodiment, the laser beams for M, C and the laser beams for Y, K, for example, have mutually opposing scanning directions in terms of the main-scan direction. As a consequence, ordinarily the control is performed in such a manner that the Y, K image data becomes a mirror image, in the main-scan direction, of the M, C image data.

The image forming unit 302 has a fixing device 307 which thermally fixes a toner image to the transfer members. A transfer member is separated from a transfer belt 306 and is charged again by corona discharge in pre-fixing corona discharge devices 326, 327. The transfer member carries a toner image, which is fixed thermally to the transfer member by the fixing device 307. Cassettes 309, 310 accommodate transfers members. A paper-supply unit 308 supplies the transfer members from the cassettes 309, 310. An attracting corona discharge device 311 is provided for the transfer member, which has been supplied by the paper-supply unit 308. A transfer-belt roller 312 cooperates with the attracting corona discharge device 311 and, at the same time that it is used to rotate the transfer belt 306, causes the transfer member to be electrically attracted to the transfer belt 306.

A de-electrifying corona discharge device 324 is for facilitating the separation of the transfer member from the transfer belt 306. A peel-off corona discharge device 325 prevents any disturbance of the image due to peel-off discharge when the transfer member is separated. Numerals 322, 323 denote transfer-belt de-electrifying corona discharge devices for de-electrifying the transfer belt 306 and initializing the same electrostatically. A belt cleaner 328 prevents disturbance of the transfer belt 306. 340 is a paper-ejection sensor for sensing the transfer member on the conveyance path as the transfer member passes by the fixing unit.

Numeral 329 denotes a paper-edge sensor for sensing the leading edge of the transfer member supplied to the transfer belt by the paper-supply unit 308. The output signal from this sensor is sent from the printer to the reader and is used in order to generate the sub-scan synchronizing signal when the video signal is sent from the reader 351 to the printer 352.

STATION INTERFACE UNITS 364

Figure 11:
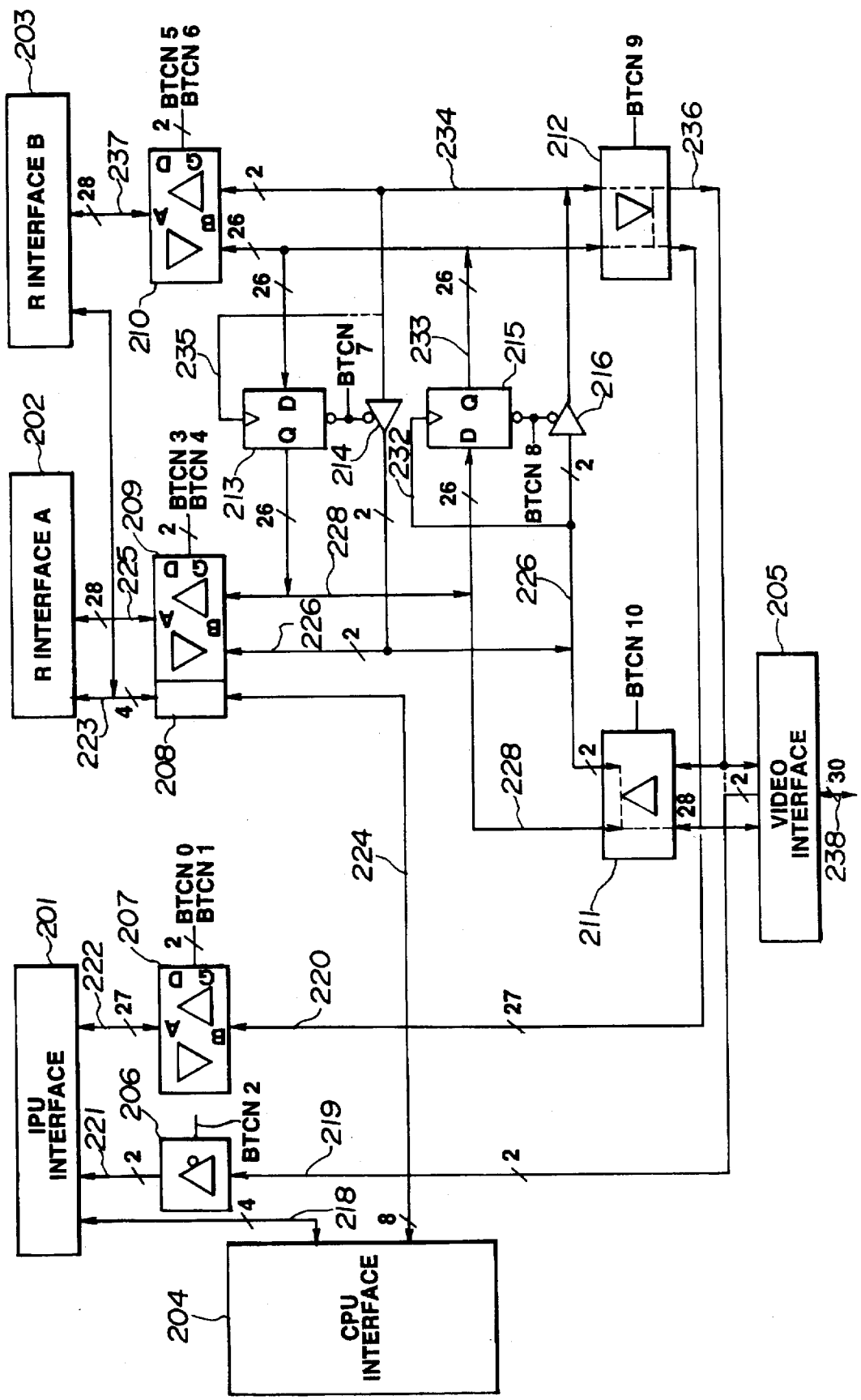
FIG. 11 is a diagram showing an arrangement of interfaces.

FIG. 11 illustrates the detailed construction of the I/F units 1101–1104 in each station shown in FIG. 2. FIG. 11 also illustrates the flow of video and synchronizing signals in each mode.

In FIG. 11, one interface unit is described. Therefore, the interface unit is denoted "364" with reference to FIG. 7.

The interface unit 364 is composed of five interfaces which are interface 201 (IPU interface) which connects this station to the IPU 1008, interface 202 (R interface A) and interface 203 (R interface B) which connect this station to other stations, CPU interface 204 which controls communication between the IPU 1108 and another station and video interface 205 in this station.

Interface 202 is used for connecting this station and another station whose address is smaller than this station's address. Interface 203 is used for connecting this station and another station whose address is bigger than this station's address. Therefore, as shown in FIG. 2, if this interface unit is in the master station, interfaces 201 and 203 are used. If this interface unit is in the slave station, the interfaces 202 and 203 are used. Interface 202 and interface 203 correspond to a connecting point B in FIG. 2.

In FIG. 11, this embodiment includes tri-state buffers 206, 211, 212, 214, 216, bidirectional buffers 207, 209, 210, a special bidirectional buffer 208 (as described later), and D-type flop-flops 213, 215 having a tri-state function.

Further, BCTN0–BTCN 10 denote I/O ports set by a CPU, not shown, 218 is a communication line (four bits) for communication between the IPU 1008 and this station, 219 and 221 are two bit signals comprising a main-scan synchronizing signal HSNC and a sub-scan synchronizing a signal ITOP, 220 or 222 is a 27-bit signal comprising three channels of eight-bit video signals+binary signal Bi+image clock (CLK)+main-scan enable signal (HVE). 224 is an eight-bit signal on a communication line for communication with another station. 223 a four-bit signal on a communication line for communication with another station.

A signal 225 is a 28 bit signal that is a combination of three video signals, Bi, HVE, a sub-scan video-enable signal (VVE) and CLK.

A signal 226 is a combination of signals (2 bits) CLK and VVE. Signals 228 and 233 are combinations of signals (26 bits) consisting of three video signals Bi and HVE. Signals 232 and 235 are CLK. A signal 234 is a combination of signals (2 bits) CLK and VVE. A signal 236 is a VVE. A signal 237 is a combination of signals (28 bits) consisting of three video signals, Bi, HVE, VVE and CLK. A signal 238 is a combination of signals (30 bits) consisting of three video signals, Bi, CLK, HVE, HSNC, VVE and ITOP.

The flow of signals and control of the I/O ports in each mode will now be described.

The tri-state buffers 206, 211, 212, 214 and 216 are enabled when the control signals (BTCN2, BTCN10, BTCN9, BTCN7, BTCN8) applied to the buffers are low ("0"), and attain a high impedance when the control signals are high ("1"). The bidirectional buffers 207, 209 and 210 are realized by an element such as a "LS245" chip. In correspondence with the control signals (BTCN0, BTCN1, BTCN3 and BTCN4, BTCN5 and BTCN6) applied to the G and D-terminals of the respective elements, if G-terminal status is low ("0") and D-terminal status is low ("0"), the data flow is B→A; if the G-terminal status is low ("0") and the D-terminal status is high ("1"), the data flow is A→B; and if the G-terminal status is high ("1"), the data flows in no direction (isolation status). The D-flip-flops 213 and 215 are enabled when the enable signals (BTCN7, BTCN8) are low ("0"), and attain a high impedance when the enable signals are high ("1"). The D-flip-flops maintain output timings of the video clock and the synchronizing signal HYNC, the enable signal EVE and the video signal to another station constant. In the tandem system of the present embodiment, the IPU 1008 and the stations 1001 to 1004 are mutually connected as shown in FIG. 1. The stations 1001 to 1004 have the same construction, and the stations respectively have a data transmission/reception/transfer mode to be described below, so as to transfer or transmit/receive image video data between them, regardless of the master-slave relation, i.e., which station is assigned as a master station and which station is assigned as a slave station.

The following explanation of the data transmission/reception/transfer mode is based on the relation between one of the stations (referred to as the "Current station") as the central station and other stations. When the "Current station" does not input data but relays the data to another station and/or the IPU, the operation is expressed as "Relay". A station having a smaller address value than that of the current station is represented as a "Lower station", and a station having a larger address value than that of the current station is represented as an "Upper station".

Mode 1: IPU→Relay→Lower station
Mode 2: IPU→Relay→Upper station
Mode 3: IPU→Current station
Mode 4: Lower station→Relay→Upper station
Mode 5: Lower station→Current station
Mode 6: Upper station→Relay→Lower station
Mode 7: Upper station→Current station
Mode 8: Current station→IPU
Mode 9: Current station→Lower station
Mode 10: Current station→Upper station
Mode 11: IPU→Relay→Upper and Lower stations
Mode 12: IPU→Current station and Relay→Lower station
Mode 13: IPU→Current station and Relay→Upper station
Mode 14: IPU→Current station and Relay →Upper and Lower station
Mode 15: Lower station→Current station and Relay→Upper station
Mode 16: Upper station→Current station and Relay→Lower station
Mode 17: Current station→IPU and Lower station
Mode 18: Current station→IPU and Upper station
Mode 19: Current station→Upper and Lower stations
Mode 20: Current station→IPU and Upper and Lower stations Note that the interface 201 is employed for data transmission/reception and relaying to the IPU 1008; the interface 202, for data transmission/reception and relaying and relaying to the lower station; and the interface 203, for data transmission/reception and relaying to the upper station.

Thus, as the respective stations have a data relaying function, even when one of the stations transfers data to a distant station, the other stations between the transferring station and the receiving station sequentially relay the data. Accordingly, regardless of the number of stations connected for relaying, the actual transfer is data transmission/reception between two stations of a series having adjacent address values and data transmission/reception to the IPU. That is, the stations may have data transfer capability for only three receivers (or transmitters).

In the digital image processing section of this embodiment having the data transmission/reception and relaying mode as described above, the number of data-transfer destination stations (or receiving stations) of the respective stations is limited to three, regardless of the number of the stations connected to the tandem system. One of these stations is used as a data transmitter station and the stations are connected as shown in FIGS. 1 and 2, and any number of stations are connectable for data transfer.

Next, the status of the control signals BTCN0 to BTCN10 from the CPU in the respective modes and the flow of video and synchronizing signals in each mode are described.

IPU interface→R interface A transfer (Mode 1)
BTCN0→"1" (high level)
BTCN1→"0" (low level)
BTCN2→"0" (low level)
BTCN3→"0" (low level)
BTCN4→"0" (low level)

BTCN5→X
BTCN6→X
BTCN7→"1" (high level)
BTCN8→X
BTCN9→"1" (high level)
BTCN10→"0" (low level)

The signal flow is signal line 238→signal line 219→signal line 221 (HSNC and ITOP from the video interface 205 to the IPU interface 201)→signal line 222→signal line 220→signal line 228→signal line 225 (the image signal (24 bits) and HVE from the IPU interface 201 to the R interface 1). Also, signal line 238 (VVE)→signal line 236 (VVE)→signal line 226+signal line 225 (VCLK and VVE from the video interface 205 to the R interface 1) in accordance with FIG. 11.

IPU interface→R interface B transfer (Mode 2)
BTCN0→"1" (high level)
BTCN1→"0" (low level)
BTCN2→"0" (low level)
BTCN3→X
BTCN4→"1" (high level)
BTCN5→"0" (low level)
BTCN6→"0" (low level)
BTCN7→"1" (high level)
BTCN8→"0" (low level)
BTCN9→"1" (high level)
BTCN10→"0" (low level)

The signal flow is signal line 238→signal line 219→signal line 221→signal line 222→signal line 220→signal line 228→signal line 236→signal line 234→signal line 237.

IPU interface→R interface B transfer (Mode 3)
BTCN0←"1" (high level)
BTCN1←"0" (low level)
BTCN2←"0" (low level)
BTCN3←X
BTCN4←X
BTCN5←X
BTCN6←X
BTCN7←X
BTCN8←X
BTCN9←"1" (high level)
BTCN10←"0" (low level)

The signal flow is signal line 238→signal line 219→signal line 221. Also, signal line 222→signal line 220→signal line 238.

R interface A→R interface B transfer (Mode 4)
BTCN0 ←X
BTCN1←X
BTCN2←X
BTCN3←"1" (high level)
BTCN4←"0" (low level)
BTCN5←"0" (low level)
BTCN6←"0" (low level)
BTCN7←"1" (high level)
BTCN8←"0" (low level)
BTCN9←X
BTCN10←"1" (high level)

The signal flow is signal line 225→signal line 228→signal line 233→signal line 237.

Also, signal line 225→signal line 226→signal line 234→signal line 237.

R interface A→video interface transfer (Mode 5)
BTCN0←X

BTCN1←"1" (high level)
BTCN2←X
BTCN3←"1" (high level)
BTCN4←"0" (low level)
BTCN5←X
BTCN6←"1" (high level)
BTCN7←"1" (high level)
BTCN8←"0" (low level)
BTCN9←X
BTCN10←"1" (high level)

The signal flow is signal line 225→signal line 228→signal line 233→signal line 220→signal line 238.

Also, signal line 225→signal line 226→signal→signal line 234→signal line 236→signal line 238.

R interface B→video interface transfer (Mode 6)
BTCN0←X
BTCN1←X
BTCN2←X
BTCN3←"0" (low level)
BTCN4←"0" (low level)
BTCN5←"1" (high level)
BTCN6←"0" (low level)
BTCN7←"0" (low level)
BTCN8←"1" (high level)
BTCN9←X
BTCN10←"1" (high level)

The signal flow is signal line 237→signal line 233→signal line 228→signal line 225.

Also, signal line 237→signal line 234→signal line 226→signal line 225.

R interface B←video interface transfer (Mode 7)
BTCN0←X
BTCN1←"1" (high level)
BTCN2←X
BTCN3←X
BTCN4←X
BTCN5←"1" (high level)
BTCN6←"0" (low level)
BTCN7←X
BTCN8←"1" (high level)
BTCN9←"0" (low level)
BTCN10←X The signal flow is signal line 237→signal line 233→signal line 220→signal line 238.

Also, signal line 237→signal line 234→signal line 236→signal line 238.

Video interface→IPU interface transfer (Mode 8)
BTCN0←"0" (low level)
BTCN1←"0" (low level)
BTCN2←"0" (low level)
BTCN3←X
BTCN4←X
BTCN5←X
BTCN6←X
BTCN7←X
BTCN8←X
BTCN9←"1" (high level)
BTCN10←X The signal flow is signal line 238→signal line 230→signal line 222.

Also, signal line 238→signal line 219→signal line 221.

Video interface→R interface A transfer (Mode 9)
BTCN0←X

BTCN1←"1" (high level)
BTCN2←X
BTCN3←"0" (low level)
BTCN4←"0" (low level)
BTCN5←X
BTCN6←X
BTCN7←"0" (low level)
BTCN8←X
BTCN9←"1" (high level)
BTCN10←"0" (low level)

The signal flow is signal line 238→signal line 220→signal line 228→signal line 236→signal line 226→signal line 225.
Video interface→R interface B transfer (Mode 10)
BTCN0←X
BTCN1←"1" (high level)
BTCN2←X
BTCN3←X.
BTCN4←"1" (high level)
BTCN5←"0" (low level)
BTCN6←"0" (low level)
BTCN7←"1" (high level)
BTCN8←"0" (low level)
BTCN9←"1" (high level)
BTCN10←"0" (low level)

The signal flow is signal line 238→signal line 220→signal line 228, signal line 225.
Also, signal line 238→signal line 236→signal line 226→signal line 225.
Video interface→R interface B transfer (Mode 10)
BTCN0←X
BTCN1←"1" (high level)
BTCN2←X
BTCN3←X
BTCN4←"1" (high level)
BTCN5←"0" (low level)
BTCN6←"0" (low level)
BTCN7←"1" (high level)
BTCN8←"0" (low level)
BTCN9←"1" (high level)
BTCN10←"0" (low level)

The signal flow is signal line 238→signal line 220→signal line 228→signal line 233→signal line 237.
Also, signal line 238→signal line 236→signal line 220→signal line 226→signal line 234→signal line 237.
Mode 1+mode 2 (Mode 11)
BTCN0←"1" (high level)
BTCN1←"0" (low level)
BTCN2←"0" (low level)
BTCN3←"0" (low level)
BTCN4←"0" (low level)
BTCN5←"0" (low level)
BTCN6←"0" (low level)
BTCN7←"1" (high level)
BTCN8←"0" (low level)
BTCN9←"1" (high level)
BTCN10←"0" (low level)

The signal flow is signal line 238→signal line 219→signal line 221,
signal line 222→signal line 220→signal line 228→signal line 225,
signal line 222→signal line 220→signal line 228→signal line 233→signal line 237, and
signal line 238→signal line 236→signal line 220→signal line 226→signal line 234→signal line 237.
Mode 1+Mode 3 (Mode 12)
BTCN0←"1" (high level)
BTCN1←"0" (low level)
BTCN2←"0" (low level)
BTCN3←"0" (low level)
BTCN4←"0" (low level)
BTCN5←X
BTCN6←"1" (high level)
BTCN7←"1" (high level)
BTCN8←X
BTCN9←"1" (high level)
BTCN10←"0" (low level)

The signal flow is signal line 238→signal line 219→signal line 221,
signal line 222→signal line 220→signal line 238,
signal line 222→signal line 220→signal line 238, and
signal line 238→signal line 236→signal line 226→signal line 225.
Mode 2+Mode 3 (Mode 13)
BTCN1←"0" (low level)
BTCN2←"0" (low level)
BTCN3←X
BTCN4←"1" (high level)
BTCN5←"0" (low level)
BTCN6←"0" (low level)
BTCN7←"1" (high level)
BTCN8←"0" (low level)
BTCN9←"1" (high level)
BTCN10←"0" (low level)

The signal flow is signal line 238→signal line 219→signal line 221,
signal line 222→signal line 220→signal line 238,
signal line 222→signal line 220→signal line 228→signal line 233→signal line 237, and
signal line 238→signal line 236→signal line 226→signal line 245→signal line 237.
Mode 1+Mode 2+Mode 3 (Mode 14)
BTCN0←"1" (high level)
BTCN1←"0" (low level)
BTCN2←"0" (low level)
BTCN3←"0" (low level)
BTCN4←"0" (low level)
BTCN5←"0" (low level)
BTCN6←"0" (low level)
BTCN7←"1" (high level)
BTCN8←"0" (low level)
BTCN9←"1" (high level)
BTCN10←"0" (low level)

The signal flow is signal line 238→signal line 219→signal line 221 (ITOP and HSNC from the video interface 205 to the IPU interface 201),
signal line 222→signal line 220→signal line 228→signal line 225 (HVE and VCLK from the IPU interface 201 to the R interface 205),
signal line 222→signal line 220→signal line 228→signal line 233→signal line 237, (HVE and VCLK from the IPU interface 201 to the R interface 202),
signal line 222→signal line 220→signal line 228→signal line 233→signal line 237 (HVE and VCLK from the IPU interface 201 to the R interface 202)
signal line 238 (VVE)→signal line 236 (VVE)→signal line 226 (VVE, VCLK)→signal line 225 (VCLK from the IPU interference 201 VVE from the video interface 205 to the R interface 202), and signal line 238 (VVE)→signal line 236→signal line 226→signal line 234→signal line 237 (VCLK from the IPU interference 201 and VVE from the video interface 205 to the R interface (202).

The present embodiment has a circuit as shown in FIG. 18 that operates in mode 14 so that the image data from the IPU interface can be transferred to the current station and another station simultaneously.

Mode 4+Mode 5 (Mode 15)
  BTCN0←X
  BTCN1←X
  BTCN2←"1" (high level)
  BTCN3←"1" (high level)
  BTCN4←"0" (low level)
  BTCN5←"0" (low level)
  BTCN6←"0" (low level)
  BTCN7←"1" (high level)
  BTCN8←"0" (low level)
  BTCN9←"0" (low level)
  BTCN10←"1" (high level)

The signal flow is signal line 225→signal line 223→signal line 233→signal line 237, signal line 225→signal line 226→signal line 234→signal line 237, signal line 225→signal line 228→signal line 233→signal line 233→signal line 220→signal line 238, and signal line 225→signal line 226→signal line 234→signal line 236→signal line 238.

Mode 6+Mode 7 (Mode 16)
  BTCN0←X
  BTCN1←"1" (high level)
  BTCN2←X
  BTCN3←"0" (low level)
  BTCN4←"0" (low level)
  BTCN5←"1" (high level)
  BTCN6←"0" (low level)
  BTCN7←"0" (low level)
  BTCN8←"1" (high level)
  BTCN9←X
  BTCN10←"1" (high level)

The signal flow is signal line 237→signal line 223→signal line 228→signal line 225, signal line 237→signal line 234→signal line 226→signal line 225, signal line 237→signal line 233→signal line 234→signal line 220→signal line 238, and signal line 237→signal line 234→signal line 236→signal line 238.

Mode 8+Mode 9 (Mode 17)
  BTCN0←"0" (low level)
  BTCN1←"0" (low level)
  BTCN2←"0" (low level)
  BTCN3←"0" (low level)
  BTCN4←"0" (low level)
  BTCN5←X
  BTCN6←X
  BTCN7←"1" (high level)
  BTCN8←X
  BTCN9←"1" (high level)
  BTCN10←"0" (low level)

The signal flow is signal line 238→signal line 219→signal line 221, signal line 238→signal line 220→signal line 225, and signal line 238→signal line 220→signal line 226→signal line 22633→signal line 225.

Mode 8+Mode 10 (Mode 18)
  BTCN0←"0" (low level)
  BTCN1←"0" (low level)
  BTCN2←"0" (low level)
  BTCN3←X
  BTCN4←"1" (high level)
  BTCN5←"0" (low level)
  BTCN6←"0" (low level)
  BTCN7←"1" (high level)
  BTCN8←"0" (low level)
  BTCN9←"1" (high level)
  BTCN10←"0" (low level)

The signal flow is signal line 238→signal line 219→signal line 221, signal line 238→signal line 228→signal line 233→signal line 237, and signal line 238→signal line 220→signal line 226→signal line 234→signal line 237

Mode 9+Mode 10 (Mode 19)
  BTCN0←X
  BTCN1←"0" (low level)
  BTCN2←X
  BTCN3←"0" (low level)
  BTCN4←"0" (low level)
  BTCN5←"0" (low level)
  BTCN6←"0" (low level)
  BTCN7←"1" (high level)
  BTCN8←"0" (low level)
  BTCN9←"1" (high level)
  BTCN10←"1" (high level)

The signal flow is signal line 238→signal line 228→225, signal line 238→signal line 228→signal line 226→signal line 233→signal line 237, and signal line 238→signal line 220→signal line 226→signal line 234→signal line 237.

Mode 8+Mode 9+Mode 10 (Mode 20)
  BTCN0←"0" (low level)
  BTCN1←"0" (low level)
  BTCN2←"0" (low level)
  BTCN3←"0" (low level)
  BTCN4←"0" (low level)
  BTCN5←"0" (low level)
  BTCN6←"0" (low level)
  BTCN7←"1" (high level)
  BTCN8←"0" (low level)
  BTCN9←"1" (high level)
  BTCN10←"0" (low level)

The signal flow is signal line 238→signal line 219→signal line 221, signal line 238→signal line 220→222, and signal line 238→signal line 220→signal line 226→signal line 234→signal line 237.

Figure 12:
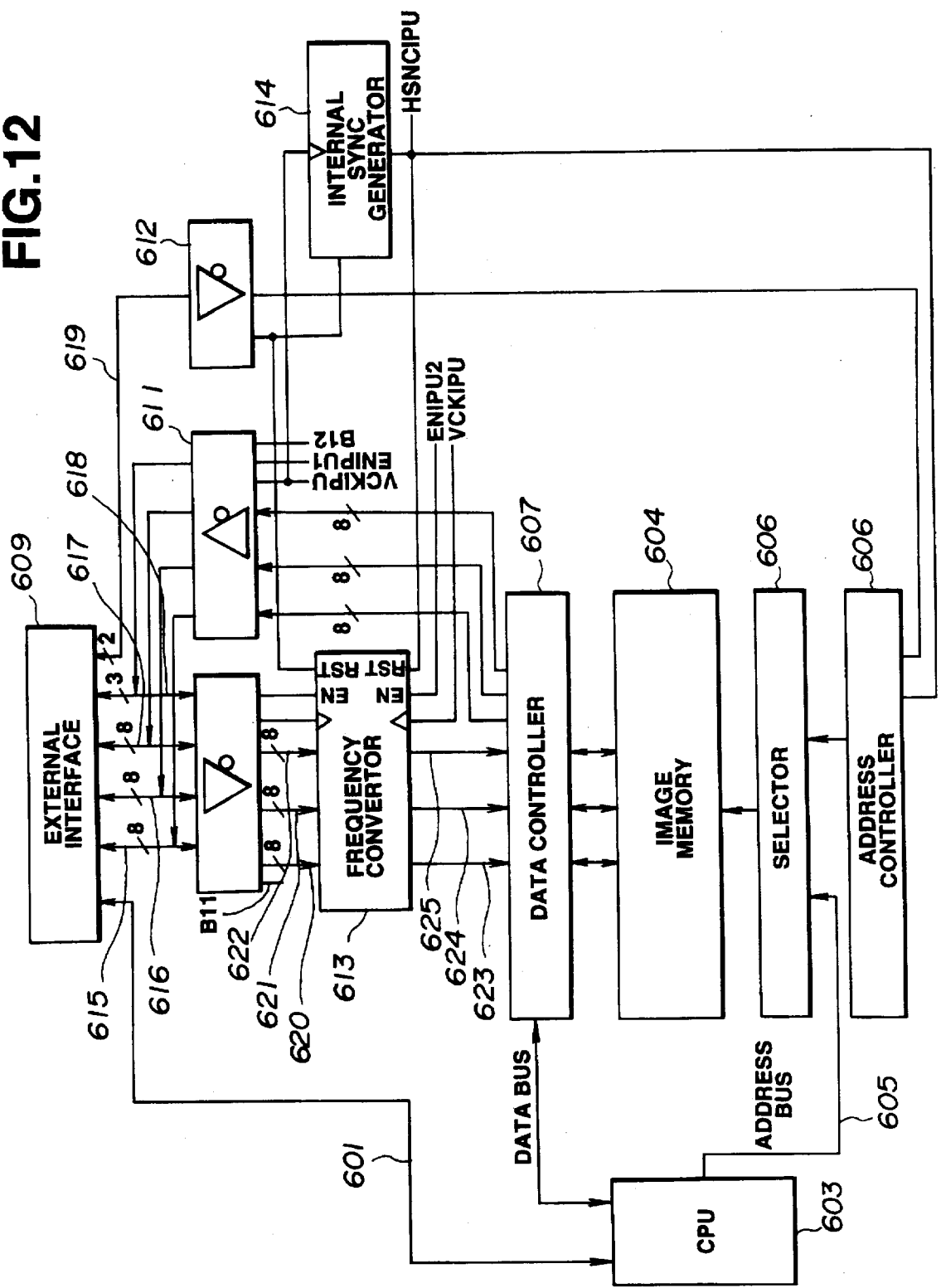
FIG. 12 is a block diagram showing the details of an image memory unit.

FIG. 12 is a detailed block diagram showing image memory unit 1008.

The image memory unit 1008 depicted in FIG. 12 accepts, under the control of a CPU 603, an image signal and a control signal from the outside (another device or the computer 1009, etc.) or from another component (the reader 351, etc.) The IPU 1008 outputs the image data stored in the image memory 604, synchronized with the outside (the reader 351 of each station). Each function will be described below.

(1) Image memory write function

The R, G, B image signals (eight bits each) 616–618 that enter from the external interface 609 set to the input mode are sent to a frequency converting circuit 613 via a tri-state buffer 610 and signal lines 620–622. At this time tri-state buffers 610 and 612 are controlled to be enabled, and tri-state buffer 611 is controlled to be disenabled.

The frequency converting circuit 613 is provided with an external clock (corresponding to the aforementioned VCLK) (one bit on signal line 618) as a write clock signal, an external main-scan synchronizing signal (one bit on signal line 618) as a write-reset signal, an enable signal (one bit on signal line 618), which is synchronized to the external main-scan synchronizing signal, as a write-enable signal, an internal main-scan synchronizing signal (HSYNCIPU) produced by an internal SYNC generator 615, based on the external main-scan synchronizing signal and the VCKIPU, as a readout-reset signal, and a readout-enable signal (ENIPU2), generated by an area-enable generator (not shown) based upon the internal main-scan synchronizing signal and internal clock. Theses signals serve as control signals and are stored in the image memory 604 via the data controller 607.

As described above, the image memory 604 has a capacity of twenty-four bits of RGB for one pixel. The memory control is executed in accordance with the external sub-scan enable signal (one bit on 619) and internal main-scan synchronizing signal HSYNCIPY via the selector 608 by the address controller 606.

A control for writing image data in the image memory 604 by the host computer 1009 will now be described.

Image data such as GPIB is sent in from a computer and temporarily accumulated in a memory (not shown) within the CPU 603 via the external interface 609 and signal line 601. The CPU 603 thereafter controls the data controller 607, the selector 608 and the address controller 606 in such a manner that the data on address bus 605 and the data bus 602 are supplied to the image memory 604. Image data from the computer is written directly in the image memory 604 via the address bus 605 and data bus 602. The image transfer at this time may make use of a DMA.

(2) Output of image data to external device

Described next will be the control for transferring image data, which has been stored in the image memory 604 by the above-described control, via the data controller 607 to the tri-state buffer 611 and the external interface 609 interface of the reader unit 351.

The image data are read out in accordance with the addresses produced by the address controller 606 in accordance with the main-scan synchronizing signal and the sub-scan synchronizing signal of the tri-state buffer 612. In this case, the CPU 603 performs control so as to disable ENIPU2, enable tri-state buffers 611, 612 and disable the tri-state buffer 610.

In the tandem system as described above, processing of the image data derived from an original image that is put on the platen of a reader of one of the stations will now be described. As described in FIG. 1, four stations 1001–1004 are connected as a tandem system and the original image is put on the platen 55 of the color reader unit 351 of the station 1001.

Operating the operating panel illustrated in FIG. 6 of this color reader unit 351 of the station 1001, the operator can confirm that the stations 1002–1004 work in order. The operator sets a copy volume and sets the stations 1001–1004 to be used.

When the operator touches the start key of the station 1001, the station 1001 assigns the set copy volume to each station, and transmits a print start command to all stations. After receiving the print start command, the stations 1002–1004 set parameters in each current station which follow the print start command and which include the copy volume, paper size and so on.

The stations 1002–1004 change an input source of the video signal in accordance with the address of station 1001, which is the original station for transmitting the command in this case, and the address of each current station. The stations 1002–1004 are changed to control the writing of image data in their memories by the VIDEO control lines (VCLK, HSYNC, VE) and wait for the image signals.

On the other hand, the station 1001 prepares for reading the original image, and the control signal for writing image data in its image memory is controlled to be outputted to the VIDEO control lines.

After that, the station 1001 begins to read the image data. The stations 1002–1004 write the transmitted image data in their memories in accordance with the control signals from the station 1001.

When the station 1001 finishes reading the image data, the station 1001 transmits an image transmitting finish command and the stations 1002–1004 begin to output the image data. Adopting the same procedure, if an original image is put on the platen of the reader of any station (1002–1004), input from a plurality of stations can be executed.

In this tandem system as described above, processing of image data which is transmitted from the host computer to the station 1001 via the IPU 1008 from a plurality of stations will now be described.

The host computer 1009 recognizes the condition of all stations via the IPU 1008. The image data are transmitted to the IPU 1008 after the host computer 1009 selects the station to be used, a copy volume and a paper size etc. in accordance with the condition of the tandem system. The IPU 1008 notifies the station 1001 of these parameters and the station 1001 transmits a print start command to the stations which are selected by the host computer 1009. The stations execute the same procedure as described before, and after that the stations wait for the image data.

The station 1001 changes the image data transmission/reception/transfer mode which shows an input end and an output end. For example, the changed mode is input from the IPU 1008 and output to another station (mode 13). After that the station 1001 transmits a command to the IPU 1008 for demanding the image data.

All video control signals for reading out the image data from the IPU 1008 and for writing the image data to the other stations (1002–1004) are produced by the station 1001 which is connected to the IPU 1008. Therefore, the image data which are read out from the IPU 1008 are simultaneously stored in the image memory of the station 1001 and the image memories of the other stations. After finishing the storing process, the station 1001 produces an image transmitting end command and each station begins to print out the image data.

In each of the cases as described above, a print start command which includes a parameter "0" for the copy volume is transmitted to each non-selected station. After receiving the print start command, the nonselected station compares the address of the selected station and the address of the station which transmits the command and, if necessary, controls the I/F unit to transfer the image signals to the destination.

If a station in the tandem system executes a local copy operation, any interruption by serial communication in the tandem system is masked. If the station is the master station, the station periodically produces a transmission command for transmitting its own status and a status demand command for each slave station. If the station which is executing a local copy is a slave station, the station periodically produces a transmission command for transmitting its own status.

As described above, it is possible to prevent an unnecessary interruption and to inform the other stations of the status of the station which is executing a local copy. After finishing the local copy, an interruption process by serial communication is permitted and the station executes a process for producing a status transmission command in accordance with a status demand command from the master station.

As shown in FIG. 6, if the station which was supposed to be selected is not usable because of, for example, the absence of recording paper, a message is displayed and the station cannot be selected. Similarly, if the station which was supposed to be transmitting is not usable because of, for example, a broken lamp, a message is displayed and the station cannot be selected as the transmitting end. The operator can then easily find other usable stations from the displayed stations.

In this embodiment, there is a master/slave relation for a plurally of stations of the tandem system, but the invention is not restricted to this embodiment. For example, after each station initializes itself, each station can periodically produce a status transmission command while there is no command from other stations.

In this case, a master station is not designated in the tandem system. Therefore, it can become difficult to control the status transmission timing and a confirmation of transmission. However, transmission control among the stations and the command system can be simplified.

Figure 13:
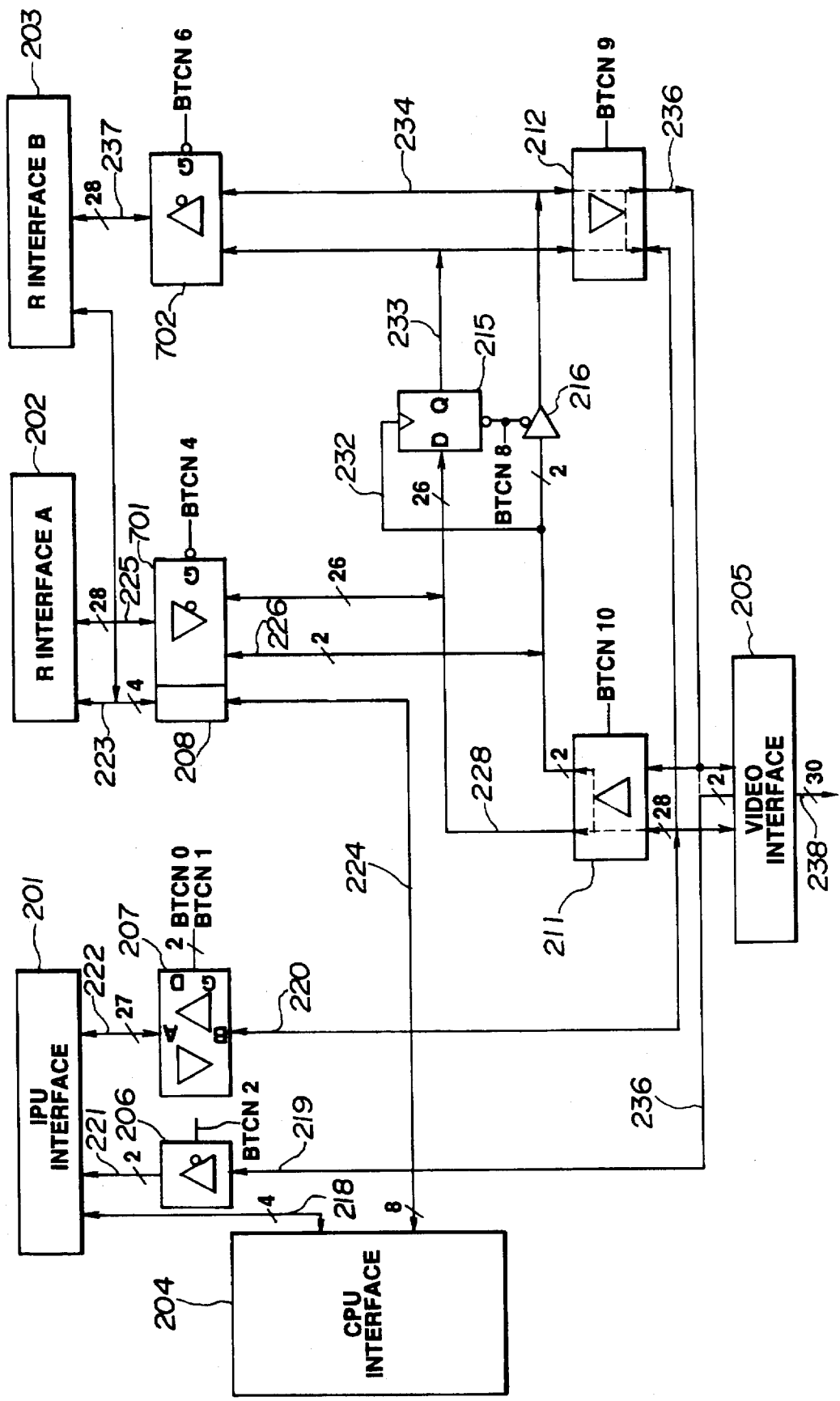
FIG. 13 is a diagram showing another arrangement of interfaces.

As shown in FIG. 11, a video image signal can be transmitted in either direction between a lower station and a upper station in the embodiment, but again this invention is not restricted as described above. As shown in FIG. 13, a system in which a lower station only can receive video image signals and an upper station only can transmit video image signals is available.

The difference between the embodiments of FIG. 11 and FIG. 13 is as follows. In FIG. 13, the interface 202 is for the exclusive use of inputting video image signals. A tri-state buffer 701 is adopted instead of the two-way buffer 209. The control signal BTCN4 is only applied to the tri-state buffer 701. The tri-state buffer 701 attains high impedance when CTCN4 is high and is enabled when BTCN4 is low. Further, there is no relay of the video image signals from the upper station to the lower station. Therefore, the D-flip-flops 213 and the tri-state buffer 214 are eliminated, and the control signals BTCN3, BTCN5, BTCN7 are not used.

In the modification as described above, there are nine data transmission/reception/transfer modes (modes 2, 5, 8, 10, 13, 15, 18).

As described above, the direction of the transmission of the image data is controlled. Therefore, a current station only can transmit image data to an upper station. However, the number of stations which can be connected is not restricted and data transmission control becomes easier.

This invention is applicable to a system which includes a plurality of external apparatuses or can use a single apparatus. This invention can be applied using hardware or software.

As described above, the digital image signals from the read out unit are transmitted to the first and/or second external apparatus via the first and/or second interface. Furthermore, the digital image signals which are produced in the first external apparatus are relayed to the second external apparatus. Therefore, the number of transmitting ends is no more than two.

As described above, the tandem system includes N (an arbitrary number) image processing apparatuses which are connected in series to each other. Therefore, it is easy to construct a system which has great flexibility.

We claim:

1. An image processing apparatus having a first address comprising:

first interface means for transferring image data to a first external image processing device having a second address different from the first address of said apparatus, second interface means for receiving image data from a second external image processing device having a third address different from both of the first and second addresses, and connecting means, responsive to receipt of image data with a destination address other than the first address, for connecting said first interface means to said second interface means to permit transfer of the image data between said first and second interface means, said connecting means being further responsive to receipt of image data with only the first address as the destination address to disconnect said first interface means from said second interface means to inhibit transfer of the image data between said first and second interface means.

2. The apparatus according to claim 1, wherein the image data is transferred in a single direction.

3. The apparatus according to claim 1, further comprising producing means for producing image data from an original.

4. The apparatus according to claim 3, wherein the image data to be transferred is image data from one of said first and second external devices or image data produced by said producing means.

5. An image processing apparatus in a system wherein said apparatus and a plurality of additional image processing apparatuses are connected in series, said apparatus comprising:

first interface means for connecting said apparatus to a first one of the additional image processing apparatuses;

second interface means for connecting said apparatus to a second one of the additional image processing apparatuses; and relay means for relaying image data from either one of the first and second additional image processing apparatuses to the other one of the first and second additional image processing apparatuses via said first and second interface means.

6. The apparatus according to claim 5, wherein the image data is transferred in two directions via said first and second interface means.

7. The apparatus according to claim 5, further comprising producing means for producing image data from an original.

8. The apparatus according to claim 7, wherein at least one of said first and second interface means has a capability of outputting both image data relayed by the other of said first and second interface means and image data produced by said producing means.

9. The apparatus according to claim 5, wherein said relay means includes a tri-state buffer.

* * * * *

UNITED STATES PATENT AND TRADEMARK OFFICE
CERTIFICATE OF CORRECTION

PATENT NO. : 5,715,066

DATED : February 3, 1998

INVENTOR(S): MITSURU KURITA ET AL.

It is certified that error appears in the above-identified patent and that said Letters Patent is hereby corrected as shown below:

COLUMN 3

Line 29, "indicting" should read --indicating--.

COLUMN 5

Line 32, "$Al_1A_3.$" should read --$Al_1\sim A_3.$--.

COLUMN 6

Line 1, "$B_1B\sim B_3,$" should read --$B_1\sim B_3,$--.

COLUMN 12

Line 33, "B←video" should read --B→video--.

COLUMN 16

Line 18, "237" should read --237.--.

UNITED STATES PATENT AND TRADEMARK OFFICE
CERTIFICATE OF CORRECTION

PATENT NO. : 5,715,066

DATED : February 3, 1998

INVENTOR(S) : MITSURU KURITA ET AL.

It is certified that error appears in the above-identified patent and that said Letters Patent is hereby corrected as shown below:

<u>COLUMN 19</u>

Line 21, "plurally" should read --plurality--.

Signed and Sealed this

Twenty-first Day of July, 1998

Attest:

*Attesting Officer*

BRUCE LEHMAN

*Commissioner of Patents and Trademarks*